United States Patent
Fisch et al.

(10) Patent No.: US 11,846,723 B2
(45) Date of Patent: Dec. 19, 2023

(54) CALIBRATING A TARGET SIMULATOR FOR AN ACTIVE ENVIRONMENT DETECTION SYSTEM

(71) Applicant: dSPACE digital signal processing and control engineering GmbH, Paderborn (DE)

(72) Inventors: Tim Fisch, Paderborn (DE); Albrecht Lohoefener, Paderborn (DE); Jeffrey Paul, Torrance, CA (US)

(73) Assignee: DSPACE GMBH, Paderborn (DE)

( * ) Notice: Subject to any disclaimer, the term of this patent is extended or adjusted under 35 U.S.C. 154(b) by 611 days.

(21) Appl. No.: 17/095,813

(22) Filed: Nov. 12, 2020

(65) Prior Publication Data

US 2022/0146627 A1  May 12, 2022

(51) Int. Cl.
*G01S 7/40* (2006.01)
*G01S 7/497* (2006.01)

(52) U.S. Cl.
CPC ............ *G01S 7/4052* (2013.01); *G01S 7/497* (2013.01); *G01S 7/4082* (2021.05)

(58) Field of Classification Search
CPC ....... G01S 7/4052; G01S 7/497; G01S 7/4082
USPC ................. 342/169, 174, 157, 368, 372, 465
See application file for complete search history.

(56) References Cited

U.S. PATENT DOCUMENTS

| 5,160,933 | A | 11/1992 | Hager |
| 6,710,737 | B1 | 3/2004 | Cronyn |
| 10,567,984 | B2 * | 2/2020 | Kong ................. H04B 17/0085 |
| 10,574,369 | B2 * | 2/2020 | Jing ....................... H04B 17/14 |
| 2020/0096554 | A1 * | 3/2020 | Orozco Valdes .. G01R 31/2884 |
| 2021/0025972 | A1 * | 1/2021 | Loesch ................. G01S 7/4017 |

FOREIGN PATENT DOCUMENTS

| DE | 102018217173 A1 | 4/2020 |
| DE | 102019008522 A1 | 8/2020 |
| GB | 2259778 A | 3/1993 |
| GB | 2267603 A | 12/1993 |
| WO | WO 2019242913 A1 | 12/2019 |

OTHER PUBLICATIONS

M. Pienaar, et al., "Active Calibration Target for Bistatic Radar Cross-Section Measurements", Radio Science, Research Article No. 10.1002/2015R8005931, pp. 515-523, May 24, 2016.

Frank Gekat, et al., "Weather Radar Calibration and Testing Using the Moon as Reference Target", AMS (American Meteorological Society), pp. 1-4, Sep. 29, 2011.

* cited by examiner

*Primary Examiner* — Bo Fan
(74) *Attorney, Agent, or Firm* — LEYDIG, VOIT & MAYER, LTD.

(57) ABSTRACT

A method for calibrating a target simulator for an active environment detection system includes: calibrating a complete signal path comprising a first signal path and a second signal path by determining a first deviation of a first value of at least one signal parameter from a first reference value of the at least one signal parameter; calibrating one of the first signal path and the second signal path by determining a second deviation of a second value of the at least one signal parameter from a second reference value of the at least one signal parameter; and calibrating the other of the first signal path and the second signal path by offsetting of the first deviation with the second deviation.

14 Claims, 4 Drawing Sheets

CALIBRATING A TARGET SIMULATOR FOR AN ACTIVE ENVIRONMENT DETECTION SYSTEM

FIELD

The invention relates to the development and testing of active environment detection systems.

BACKGROUND

An environment detection system is to be understood as meaning a computer system equipped with sensor technology which can independently detect objects in its environment. In the vehicle industry in particular, there is currently a trend toward automation, in the course of which vehicles are increasingly equipped with environment detection systems. However, such systems are also used in other fields, for example in robotics, traffic monitoring or airspace monitoring. A differentiation is to be made between passive systems, which are configured purely as signal receivers, and active systems, which independently emit signals, in order to detect objects using the echo signals that they reflect. Conventional active environment detection systems are normally based on ultrasound, radio waves (radar), or laser light (lidar).

Many active environment detection systems are provided for safety-critical tasks, for example the control of an automated vehicle, so that correct functionality must be ensured before the start of their production. In order to be able to test active environment detection systems safely and in a reproducible manner, target simulators exist on the market. These are test stands or components of test stands which, via artificially generated echoes, emulate an operation in an ordinary environment for an active environment detection system placed as a test piece in or in front of the target simulator. A target simulator comprises a receiving device in a first signal path for registering a wireless signal generated by the test piece for detecting objects in the environment, a transmitting device in a second signal path for generating a time-delayed echo signal and a simulator device for controlling the transmitting device.

The basic functions of the simulator device are the specification of the time delay and the signal characteristics of the simulated echo signal. The signal characteristics are defined by a set of parameters which may in particular include one or more of the following parameters: amplitude, frequency, phase, pulse width. Each of the aforementioned parameters may also be represented in a plurality of instances in the signal characteristics, in order to describe the simulated echo signal as a superposition of a plurality of wave packets. Each parameter may be specified as an absolute or as relative value. For example, an amplitude may also be predetermined as a scaling factor for the amplitude of a signal received at the receiving device, and a frequency may be predetermined as a frequency shift of the frequency of a signal received at the receiving device. The simulator device may also be configured to transmit parameters, which are not predetermined by the signal characteristics, directly from a signal received at the receiving device to the echo signal generated by the transmitting device. For example, the simulator device may be configured to scale down a signal received at the receiving device exclusively by a scaling factor predetermined in the signal characteristics and to emit the received signal, unmodified apart from the scaling, via the transmitting device.

The signal characteristics for the transmitting device may be determined by the simulator device in various manners having different complexity. In the simplest instance, the signal characteristics may be statically predetermined. The signal characteristics may be selected from a predefined selection of signal characteristics or follow a predefined time curve. The signal characteristics may also be predetermined by a complex computer simulation of an environment of the active environment detection system, so that the signals generated by the transmitting device simulate echo signals from virtual objects in the environment. A target simulator may also include more than one receiving device and more than one transmitting device to simulate echo signals from multiple objects simultaneously. A transmitting device may be statically mounted, or a transmitting device may be mounted so as to be movable, in order to simulate echo signals from moving objects.

An example of such a target simulator is the radar target simulator DARTS from dSPACE GmbH, provided for radar systems. In a radar target simulator, the receiving device is configured as a first antenna for receiving a radar signal from a test piece designed as a radar system, and the transmitting device is designed as a second antenna for generating a radar signal, in order to simulate a radar echo of a radar signal received at the first antenna. In a lidar target simulator for lidar systems, the receiving device is designed as a photodetector for receiving a laser signal from a test piece designed as a lidar system, and the transmitting device is designed as a light source arrangement for generating a light signal, in order to simulate a light reflection of a laser signal received at the photodetector.

Both radar and lidar systems generally require a regular recalibration after delivery, because the components installed in both signal paths change their electrical behavior with continued use. The problem relates to environment detection systems and target simulators in the same way, because both types of radar or lidar systems comprise a first signal path with a receiving device and a second signal path with a transmitting device. The signal paths are merely used in a different order. While an environment detection system first controls the transmitting device, in order to evaluate the subsequent echo signal via the receiving device, target simulators first use the receiving device in order to generate an echo signal via the transmitting device. The basic technical equipment of both transmission paths is similar in both types of systems. Each recalibration of a target simulator currently requires either a disassembly of the target simulator and its dislocation or a visit on site by a technical service provider. Both incur high costs and long downtimes of the target simulator for the operator.

SUMMARY

In an exemplary embodiment, the present invention provides a method for calibrating a target simulator for an active environment detection system. The method includes: controlling, by a simulator device, a transmitting device to generate an electromagnetic test signal having predefined signal characteristics; reflecting, via a reference reflector mounted at a predetermined spatial position in relation to a receiving device and the transmitting device, the test signal to the receiving device; measuring a first value of at least one signal parameter corresponding to the reflected test signal received at the receiving device; calibrating a complete signal path comprising a first signal path and a second signal path by determining a first deviation of the first value of the at least one signal parameter from a first reference value of the at least one signal parameter, wherein the first signal path includes the receiving device, and the second signal path includes the transmitting device; mounting a pre-calibrated calibration device at a predetermined spatial position in relation to the receiving device or the transmitting device, wherein: the pre-calibrated calibration device is configured to generate an electromagnetic calibration signal for the first signal path having predefined signal characteristics and emit the electromagnetic calibration signal for the first signal path to the receiving device; or the simulator device is configured to control the transmitting device to generate an electromagnetic calibration signal for the second signal path having predefined signal characteristics, and the pre-calibrated calibration device is configured to receive the electromagnetic calibration signal for the second signal path from the transmitting device; measuring a second value of the at least one signal parameter corresponding to the electromagnetic calibration signal for the first signal path or the electromagnetic calibration signal for the second signal path; calibrating one of the first signal path and the second signal path by determining a second deviation of the second value of the at least one signal parameter from a second reference value of the at least one signal parameter; and calibrating the other of the first signal path and the second signal path by offsetting of the first deviation with the second deviation.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
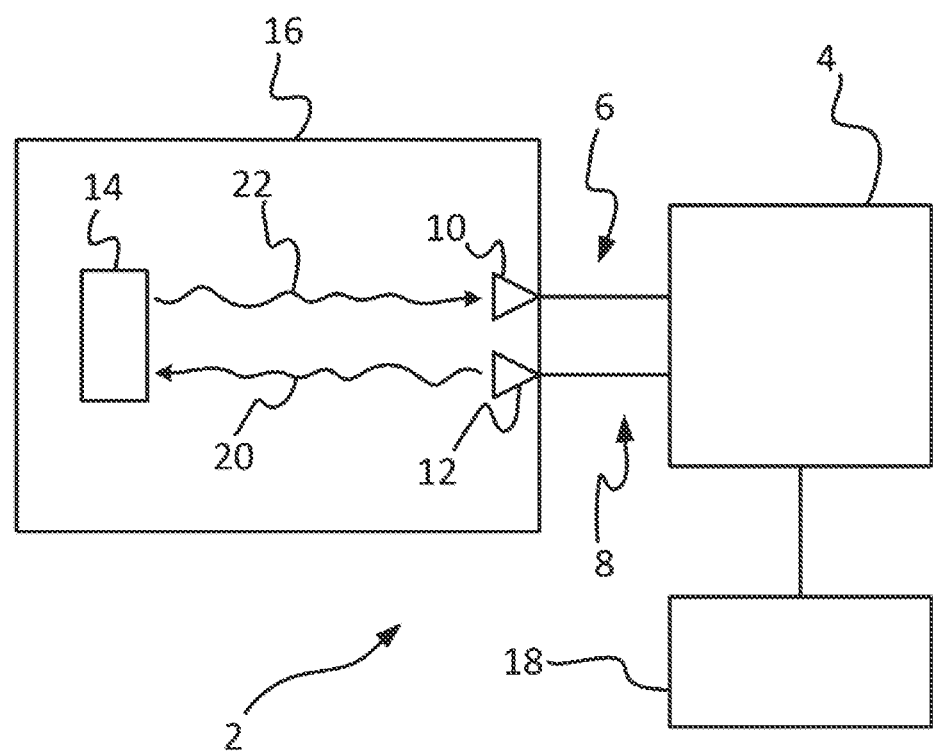
FIG. 1 depicts a target simulator designed as a radar target simulator, in normal operation.

Exemplary embodiments of the invention simplify the calibration of a target simulator for an active environment detection system.

In exemplary embodiments of the invention, calibration takes place using a well-defined reference reflector and a calibration device, wherein first a complete signal path comprising the first signal path with the receiving device and the second signal path with the transmitting device is calibrated via the reference reflector. For this purpose, the simulator device controls the transmitting device in such a way that the transmitting device generates a test signal with predefined signal characteristics provided for the calibration of the complete signal path. The test signal is reflected to the receiving device via the reference reflector, which is mounted at a predetermined spatial position in relation to the receiving device and the transmitting device. The reflected test signal received at the receiving device is measured, i.e. the simulator device determines the value of at least one signal parameter of the test signal provided for calibration after receiving the reflected test signal at the receiving device.

A first deviation of the signal parameter determined in the reflected test signal from a first reference value of the signal parameter is subsequently determined. By determining the first deviation, the complete signal path is calibrated, but the individual signal paths are not yet calibrated. In other words, what error the first signal path and second signal path impart in total to the signal parameter is known, but what contribution the first signal path and second signal path contribute to the error is not known in detail. Since, given a target simulator, first and second signal paths are used independently of one another (the signal generated by the transmission device is not a real echo but rather an artificially generated one), this is not sufficient; rather, both signal paths are to be calibrated.

For this purpose, a pre-calibrated, in particular pre-adjusted calibration device is subsequently mounted in or in front of the target simulator, via which either the first signal path or the second signal path is calibrated. If the calibration device is provided for calibrating the first signal path, the calibration device is configured to generate an electromagnetic calibration signal having predefined signal characteristics and is mounted at a predetermined spatial position in relation to the receiving device, so that the calibration signal is received by the receiving device. If the calibration device is provided for calibrating the second signal path, the calibration device is configured to receive and measure an electromagnetic calibration signal having predefined signal characteristics from the transmission device, and the simulator device is configured to control the transmission device to generate the calibration signal.

The signal parameter to be calibrated is measured in the calibration signal, and a second deviation of the signal parameter measured in the calibration signal from a second reference value is subsequently determined. Depending on the embodiment of the calibration device as signal transmitter or signal receiver, either the first signal path or the second signal path is thus calibrated.

Using the information now present, the signal path still uncalibrated after determination of the second deviation can also be calibrated without further measurements. For this purpose, the error imparted by the already calibrated signal path needs only to be subtracted from the total error determined via the reference reflector. The calibration of the signal path still uncalibrated after the determination of the second deviation thus takes place via a simple offsetting of the first deviation with the second deviation.

The reference reflector is preferably a corner reflector, although other designs of the reference reflector are also possible for implementing the method according to the invention, for example a metal sphere for a radar target simulator or a planar mirror for a lidar target simulator. A well-defined reference reflector is to be understood to mean that the reference reflector is standardized with regard to its structural design, so that an irradiation of the reference reflector with a well-defined electromagnetic signal from a well-defined distance at a well-defined solid angle produces a generation of a well-defined echo signal by the reference reflector.

In an embodiment, the target simulator advantageously comprises a first holding device for mounting the calibration device and a second holding device for mounting the reference reflector. The holding devices are advantageously configured and installed in or in front of the target simulator in such a way that they force a correct mounting at the respective prescribed spatial position and in the correct alignment of the reference reflector or the calibration device. For this purpose, the holding devices may, for example, be installed in a closed or open test chamber of the target simulator and, for example, be configured for locking, screwing, inserting, or supporting the reference reflector or the calibration device.

Exemplary embodiments of the method considerably reduce the cost and time expenditure to calibrate a target simulator for an active environment detection system. A user of a target simulator may perform it independently on site with little effort, insofar as a pre-calibrated calibration device is available to them, which can be sent to them if necessary, for example.

In an exemplary embodiment, some measuring processes and computing steps for calibrating the target simulator are performed by the calibration device, such that a data exchange between calibration device and simulator device is performed. For example, such data exchange may take place via a bus connection which is automatically configured upon attachment of the calibration device, via a wired data connection, for example a Universal Serial Bus (USB) cable or an Ethernet cable; a radio connection, for example a wireless local area network (WLAN) or Bluetooth connection; or also manually, for example via interfaces at the simulator device and the calibration device for the connection of a PC (personal computer).

The calibration device may preferably be configured as a pre-adjusted transmitter for generating an electromagnetic signal, that is to say for calibrating the first signal path, which is configured to generate a well-defined calibration signal. In this embodiment, all measurement and calculation steps for performing an exemplary embodiment of the method can be integrated into the simulator device. This embodiment makes it possible to supply each user with a pre-adjusted calibration device as an accessory, and to store a number of pre-adjusted calibration devices, so that a user may regularly exchange his calibration device for an adjusted new calibration device.

Advantageously, the target simulator is adjusted before first being put into service, wherein the first reference value and the second reference value are measured at the adjusted target simulator. The determinations of the first deviation and the second deviation are advantageously automated and functionally integrated into the simulator device. For this purpose, the first reference value and the second reference value are advantageously stored in a storage medium (e.g., a memory) readable by the simulator device, and the simulator device reads out the first reference value from the storage medium to determine the first deviation, and reads out the second reference value from the storage medium in order to determine the second deviation.

Advantageously, the target simulator independently performs the step of calibrating the complete signal path via the reference reflector, in order to establish a need for calibration of the target simulator, without a user of the target simulator needing to initialize this step. For this purpose, the test stand may be configured in order to automatically determine the first deviation by generating the test signal after a defined time has elapsed and/or at fixed events, for example after the target simulator has been placed into service or taken out of service; to compare the first deviation with a threshold, and to notify the user of a need for calibration if the first deviation exceeds a threshold. After reporting a need for calibration, the user may properly attach the calibration device, in order to implement the remaining method steps for calibrating the target simulator.

To enable a fully automatic determination of a need for calibration, the reference reflector may be permanently installed in the target simulator. In order to thereby minimize unwanted echo signals of the reference reflector in the running operation of the target simulator, the signal characteristics of the test signal stored in the simulator device may predetermine a very high intensity of the test signal that is substantially higher than the maximum intensity of a signal generated by the transmission device that is to be expected in normal operation of the target simulator. The reference reflector can then be configured to be correspondingly small or weakly reflective, so that its echo signals are only weakly pronounced during running operation, sufficiently weak to ignore them as background noise.

Since the signal propagation time of the complete signal path is well-defined and known, the simulator device may also be configured, in particular programmed, to deliberately ignore the echo signal generated by the reference reflector during running operation. However, this embodiment may possibly be prone to error, since under circumstances it may result in ignoring a signal generated by the test piece if it randomly reaches the receiving device simultaneously with an echo signal.

In another embodiment of the target simulator, the reference reflector is configured to be deactivatable for a normal operation of the target simulator. For this purpose, the holding device of the reference reflector may be equipped with a mechanism which permits a removal, concealment, tilting or displacement of the reference reflector. The target simulator may also be configured to only optionally perform the fully automatic calibration of the complete signal path, insofar as the reference reflector is mounted and is not deactivated according to the method. For example, the simulation device may be configured to cyclically generate a test signal, but to perform the calibration of the complete signal path and the determination of a calibration requirement only if the receiving device receives the reflected test signal.

In yet another embodiment, the target simulator is configured to perform the determination of the need for calibration independently and fully automatically, as described above, but is furthermore configured to fully automatically deactivate the reference reflector, after determination of the need for calibration, via an electrically operated mechanism, for example an electrically operated masking, tilting or displacement of the reference reflector, in order to prepare the target simulator for normal operation without the reference reflector.

The illustration of FIG. 1 shows a radar target simulator 2 in normal operation. The radar target simulator 2 comprises a simulator device 4 and a test chamber 16. The test chamber 16 accommodates as a test piece 14 an environment detection system configured to generate a radar signal 22, to receive an echo signal 20 of the radar signal 22 and to detect its environment using the echo signal, for example to locate objects or to determine their velocities.

The test chamber 16 comprises as a receiving device a first antenna 10 configured for receiving radar signals 22 of the test piece 14, and as a transmitting device a second antenna 12 for generating a radar signal, in order to simulate an echo signal 20 of a radar signal 22 received at the first antenna 10.

The first antenna 10 is part of a first signal path 6, and the second antenna 12 is part of a second signal path 8. Both signal paths also respectively comprise a signal line to the simulator device 4 and electronic components for processing, preparation and forwarding of signals.

A central computer 18 is connected to the simulator device 4. The central computer 18 executes a simulation within which a virtual instance of the test piece 14 interacts with further virtual objects in a virtual environment and provides the simulator device 4 with the spatial positions of the further virtual objects relative to the test piece 14. The simulator device 4 comprises a processor which, in response to the reception of a radar signal 22 at the first antenna 10, determines a propagation time and signal characteristics of a virtual radar echo of the radar signal reflected by a virtual object. The simulator device 4 is furthermore configured to control the second antenna 12 in such a way that it generates an echo signal 20 that has the determined signal characteristics of the virtual radar echo and is received from the test piece 14 precisely after the determined propagation time has elapsed.

Figure 2:
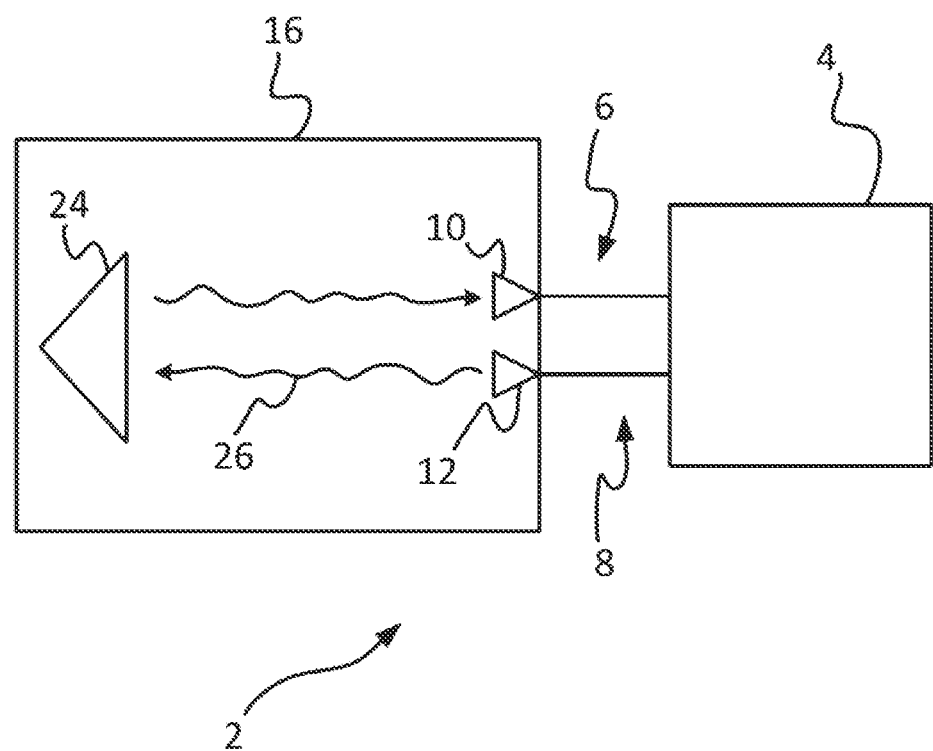
FIG. 2 depicts a calibration of a complete signal path of the radar target simulator via a reference reflector.

The illustration of FIG. 2 shows the calibration of a complete signal path of the target simulator 2 via a reference reflector 24. The reference reflector is a corner reflector whose structural design, positioning and spatial alignment are precisely prescribed in the test chamber 16. The test chamber 16 comprises a first holding device for the reference reflector 24, which forces the correct positioning and alignment of said reference reflector 24. The complete signal path comprises the first signal path 6, the second signal path 8 and the signal path from the second antenna 12 to the reference reflector 24 and from there back to the first antenna 10.

In order to calibrate the complete signal path, the simulator device 4 controls the second antenna 12, in order to generate a test signal 26 with signal characteristics predefined for the test signal. The signal characteristics are defined by one or more signal parameters, of which at least one signal parameter is provided for calibration. If the goal of the calibration process is, for example, the calibration of the amplitude, the simulator device 4 then controls the second antenna 12, in order to generate a test signal 26 with a predefined amplitude. The reference reflector 24 reflects the test signal 26 to the first antenna 10. The simulator device 4 measures the parameter provided for calibration in the test signal 26 received at the first antenna 10, and ascertains a first deviation of the measured value of the parameter from a first reference value. The first reference value is stored in a storage medium of the simulator device 4 and originates from a measurement which was performed after an initial adjustment of the target simulator 2, before it is first put into operation.

The target simulator 2 compares the first deviation with a threshold stored in the same storage medium. If the first deviation exceeds the threshold, the simulator device 4 reports a need for calibration, for example via a luminous display or a status report at an operator interface.

Figure 3:
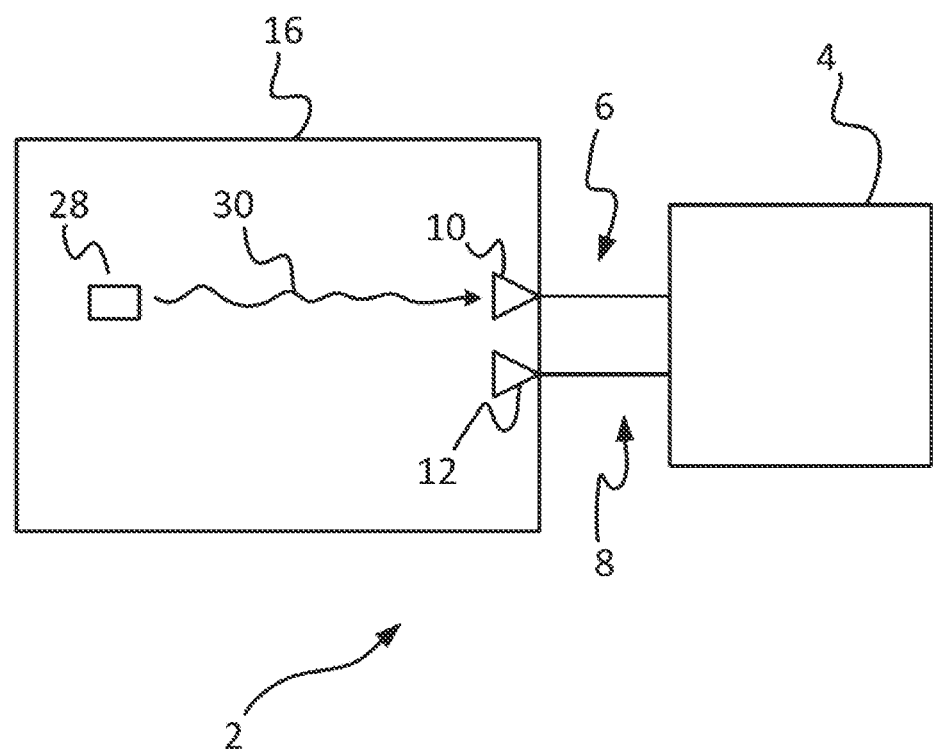
FIG. 3 depicts a calibration of the first signal path of the radar target simulator via a calibration device designed as a radar transmitter.

To calibrate the first signal path and the second signal path, a user of the target simulator 2 attaches a calibration device 28 at a second holding device in the test chamber 16, as shown in the illustration of FIG. 3. The second holding device forces the mounting of the calibration device 28 at a predetermined spatial position in the measuring chamber 16.

The calibration device 28 is configured to generate a calibration signal 30 having predefined signal characteristics and emit said signal 30 to the first antenna 10. The simulator device 4 measures the signal parameter to be calibrated in the calibration signal 30 and determines a second deviation of the measured signal parameter from a second reference value of the signal parameter. The second reference value, like the first reference value, is stored in the storage medium and originates from a measurement which was performed after the initial adjustment of the target simulator, before it was first put into operation, and via an adjusted or calibrated calibration device 28.

The calibration device 28 is at least calibrated, preferably adjusted, in order to implement the method, in order to be able to ascertain a second deviation from the measured value of the parameter in the calibration signal 30. Accordingly, to implement the method it is accordingly to be ensured that a pre-calibrated calibration device 28 is present.

The target simulator 4 calculates an error of the first signal path 6 from the second deviation, and automatically stores the error in the storage medium, in order to take it into account in future measurements of radar signals 22. The first signal path 6 is thus calibrated and adjusted. After determination of the second deviation, the second signal path 8 can also be calibrated in a simple manner since an error of the complete signal path can be deduced from the first deviation. The error of the second signal path 8 results from the difference between the error of the complete signal path and the error of the first signal path 6. In this way, the target simulator calculates the error of the second signal path 8 from an offsetting of the first deviation with the second deviation, and stores the error of the second signal path in the storage medium, in order to take it into account in the future in the determination of signal characteristics for echo signals 20. The second signal path 8 is thus also calibrated and adjusted.

In the simplest instance, the offsetting of the first deviation with the second deviation is a simple difference calculation. However, additional influencing variables are possibly also to be taken into account in the offsetting, for example a known error in the generation of the calibration signal 30 or a scaling factor, in order to take into account different signal strengths of the reflected test signal 26 and of the calibration signal 30.

Figure 4:
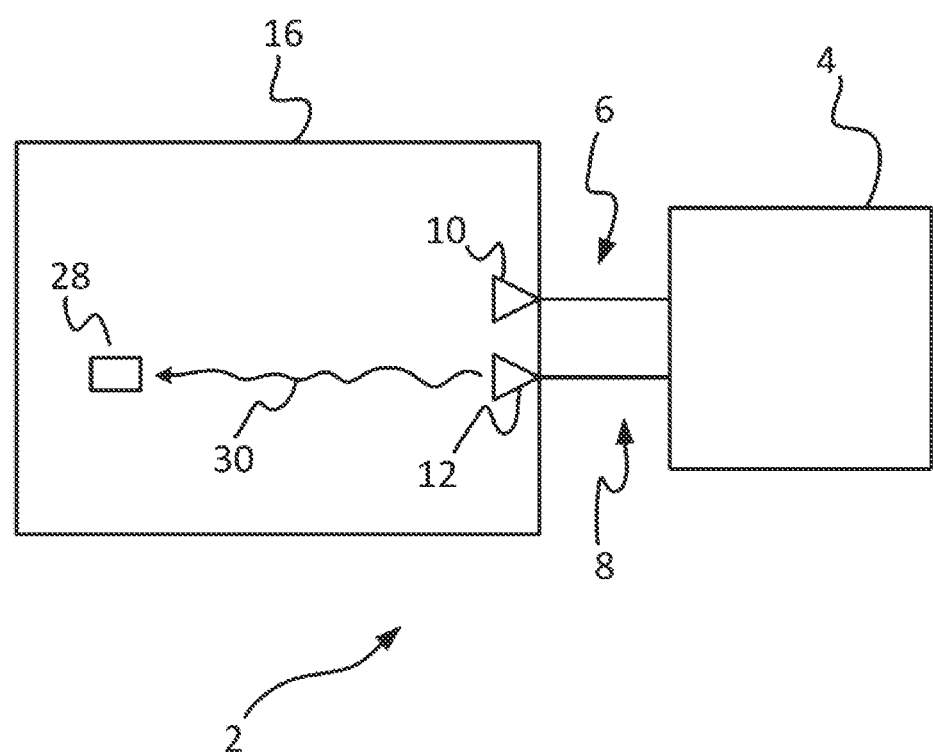
FIG. 4 depicts, as an alternative to the embodiment in FIG. 3, a calibration of the second signal path of the radar target simulator via a calibration device designed as a radar receiver.

The illustration of FIG. 4 shows an alternative embodiment to that shown in FIG. 3. The calibration device 28 is configured as a radar receiver instead of as a radar transmitter, and the calibration signal 30 is generated by the simulator device 4 by controlling the second antenna 12. The pre-calibrated calibration device 28 measures the parameter to be calibrated in the calibration signal 30 received from the second antenna 12, and a second deviation of the measured parameter from a second reference value is determined, in order to determine an error of the second signal path 8 and thereby calibrate the second signal path 8. By offsetting the first deviation with the second deviation, the first signal path 6 is then calibrated as depicted above. All calculation steps for calibrating the second signal path 8 may be performed either in the calibration device 28 or in the simulator device 4, after the relevant information has been transmitted from the calibration device 28 to the simulator device 4.

The target simulator 2 shown in the Figures is configured as a radar target simulator only by way of example. All method steps described with reference to Figures can analogously also be applied to a lidar target simulator. In a lidar target simulator, the first antenna 10 would instead be configured as a photodetector; the second antenna 12 as a light source, for example as a photodiode, as a matrix of photodiodes, or as a laser arrangement; the reference reflector 24 as a suitable reflector for the light source, for example as a mirror, as a white surface, or as a triple prism or corner reflector; the calibration device 28 as a pre-calibrated light source or as a pre-calibrated photodetector; and the test piece 14 as a lidar system.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for calibrating a target simulator for an active environment detection system, comprising:
   controlling, by a simulator device, a transmitting device to generate an electromagnetic test signal having predefined signal characteristics;
   reflecting, via a reference reflector mounted at a predetermined spatial position in relation to a receiving device and the transmitting device, the test signal to the receiving device;
   measuring a first value of at least one signal parameter corresponding to the reflected test signal received at the receiving device;
   calibrating a complete signal path comprising a first signal path and a second signal path by determining a first deviation of the first value of the at least one signal parameter from a first reference value of the at least one signal parameter, wherein the first signal path includes the receiving device, and the second signal path includes the transmitting device;
   mounting a pre-calibrated calibration device at a predetermined spatial position in relation to the receiving device or the transmitting device, wherein:
      the pre-calibrated calibration device is configured to generate an electromagnetic calibration signal for the first signal path having predefined signal characteristics and emit the electromagnetic calibration signal for the first signal path to the receiving device; or
      the simulator device is configured to control the transmitting device to generate an electromagnetic calibration signal for the second signal path having predefined signal characteristics, and the pre-calibrated calibration device is configured to receive the electromagnetic calibration signal for the second signal path from the transmitting device;
   measuring a second value of the at least one signal parameter corresponding to the electromagnetic calibration signal for the first signal path or the electromagnetic calibration signal for the second signal path;
   calibrating one of the first signal path and the second signal path by determining a second deviation of the second value of the at least one signal parameter from a second reference value of the at least one signal parameter; and
   calibrating the other of the first signal path and the second signal path by offsetting of the first deviation with the second deviation.

2. The method according to claim 1, further comprising:
   adjusting the target simulator and measuring the first reference value and the second reference value at the adjusted target simulator.

3. The method according to claim 1, further comprising:
   storing the first reference value and the second reference value in a memory readable by the simulator device;
   reading the first reference value via the simulator device to determine the first deviation; and
   reading the second reference value via the simulator device to determine the second deviation.

4. The method according to claim 1, further comprising:
   automatically determining the first deviation after putting the target simulator into operation or taking the target simulator out of operation;
   automatically comparing the first deviation with a threshold; and
   reporting a need for calibration of the target simulator based on the first deviation exceeding the threshold.

5. The method according to claim 1, wherein:
   the target simulator is a radar target simulator for a radar system,
   the receiving device is a first antenna for receiving a radar signal from a test piece configured as a radar system, and
   the transmitting device is a second antenna for generating a radar signal in order to simulate a radar echo of a radar signal received at the first antenna.

6. The method according to claim 1, wherein:
   the target simulator is a lidar target simulator for a lidar system,
   the receiving device is a photodetector for receiving a laser signal from a test piece configured as a lidar system, and
   the transmitting device is a light source arrangement for generating a light signal, in order to simulate a light reflection of a laser signal received at the photodetector.

7. A target simulator for an active environment detection system, the target simulator comprising:
   a first signal path having a receiving device for receiving an electromagnetic signal from a test piece configured as an environment detection system;
   a second signal path having a transmitting device for generating an electromagnetic signal, in order to simulate an echo signal of a signal received at the receiving device;
   a simulator device for specifying signal characteristics of an echo signal after receipt of a signal by the receiving device, and for controlling the transmitting device to generate the echo signal having the signal characteristics;
   a reference reflector for reflecting a test signal generated by the transmitting device;

a first holding device for holding the reference reflector at a predetermined spatial position in relation to the receiving device and the transmitting device, such that the reference reflector is configured to reflect a test signal generated by the transmitting device to the receiving device;

a pre-calibrated calibration device configured to: generate an electromagnetic calibration signal for the first signal path having predefined signal characteristics; or receive an electromagnetic calibration signal for the second signal path having predefined signal characteristics from the transmitting device and measure the electromagnetic calibration signal for the second signal path; and a second holding device for mounting the pre-calibrated calibration device at a predetermined spatial position in relation to the receiving device for measurement of the electromagnetic calibration signal for the first signal path by the receiving device or in relation to the transmitting device for measurement of the electromagnetic calibration signal for the second signal path by the pre-calibrated calibration device;

wherein the simulator device is configured to:
control the transmitting device to generate the test signal, wherein the test signal has predetermined signal characteristics;
measure a first value of at least one signal parameter corresponding to the test signal reflected by the reference reflector to the receiving device; and
calibrate a complete signal path, comprising the first signal path and the second signal path, by determining a first deviation of the first value of the at least one signal parameter from a first reference value of the at least one signal parameter;
obtain a second value of the at least one signal parameter, wherein obtaining the second value of the at least one signal parameter comprises:
measuring the at least one signal parameter corresponding to the electromagnetic calibration signal for the first signal path; or
controlling the transmitting device to generate the electromagnetic calibration signal for the second signal path to facilitate measurement of the at least one signal parameter corresponding to the electromagnetic calibration signal for the second signal path by the pre-calibrated calibration device;
calibrate one of the first signal path and the second signal path by determining a second deviation of the second value of the at least one signal parameter from a second reference value of the at least one signal parameter; and
calibrate the other of the first signal path and the second signal path by offsetting of the first deviation with the second deviation.

8. The target simulator according to claim 7, wherein the reference reflector is deactivatable for a normal operation of the target simulator by removing, occluding, tilting, or displacing the reference reflector.

9. The target simulator according to claim 7, wherein the reference reflector is permanently and immovably installed in the target simulator.

10. The target simulator according to claim 9, wherein the predetermined signal characteristics of the test signal have a substantially higher intensity relative to signals generated by the transmitting device in normal operation of the target simulator; and
wherein signals reflected by the reference reflector to the receiving device during normal operation have negligible intensity.

11. The target simulator according to claim 9, wherein the simulator device is further configured to:
automatically determine the first deviation after the target simulator is placed into operation or taken out of operation;
compare the first deviation with a threshold; and
report a need for calibration based on the first deviation exceeding the threshold.

12. The target simulator according to claim 7, wherein the simulator device is further configured to:
determine an error of the first signal path and to store it in a memory;
determine an error of the second signal path and store it in the memory;
take the error of the first signal path into account for adjusting the first signal path in future measurements; and
take the error of the second signal path into account for adjusting the second signal path in future measurements.

13. The target simulator according to claim 7, wherein:
the target simulator is a radar target simulator for a radar system;
the receiving device is a first antenna for receiving a radar signal from the test piece, wherein the test piece is configured as a radar system; and
the transmitting device is a second antenna for generating a radar signal, in order to simulate a radar echo of a radar signal received at the first antenna.

14. The target simulator according to claim 7, wherein:
the target simulator is a lidar target simulator for a lidar system;
the receiving device is a photodetector for receiving a laser signal from the test piece, wherein the test piece is configured as a lidar system; and
the transmitting device is a light source arrangement for generating a light signal, in order to simulate a light reflection of a laser signal received at the photodetector.

* * * * *